United States Patent
Kawamoto (10) Patent No.: US 10,439,532 B2
(45) Date of Patent: Oct. 8, 2019

(54) DRIVING DEVICE, PRINTER DEVICE, AND METHOD THEREOF

(71) Applicant: TOSHIBA TEC KABUSHIKI KAISHA, Tokyo (JP)

(72) Inventor: Tsutomu Kawamoto, Sunto Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/033,452

(22) Filed: Jul. 12, 2018

(65) Prior Publication Data
US 2019/0028048 A1    Jan. 24, 2019

(30) Foreign Application Priority Data

Jul. 21, 2017    (JP) ................. 2017-142032

(51) Int. Cl.
*B41J 13/00* (2006.01)
*H02P 8/12* (2006.01)
(Continued)

(52) U.S. Cl.
CPC ............ *H02P 8/24* (2013.01); *B41J 13/0009* (2013.01); *B41J 29/38* (2013.01); *B41J 33/14* (2013.01);
(Continued)

(58) Field of Classification Search
CPC ........ B41J 13/0009; B41J 29/38; B41J 33/14; B65H 20/005; B65H 20/02; H02P 8/00;
(Continued)

(56) References Cited

U.S. PATENT DOCUMENTS 6,184,646 B1 *   2/2001   Yagoshi ................. G03G 15/65
                                                                          318/696
6,963,415 B1 *   11/2005   Saito ....................... B41J 11/42
                                                                          318/696
(Continued)

FOREIGN PATENT DOCUMENTS

EP           2424103 A2      2/2012
EP           3136585 A2      3/2017

OTHER PUBLICATIONS

Extended European Search Report dated Nov. 28, 2018 in corresponding European Patent Application No. 18184237.8, 11 pages.

*Primary Examiner* — Anh T Vo
(74) *Attorney, Agent, or Firm* — Kim & Stewart LLP (57) ABSTRACT

A driving device for a stepping motor includes a motor driving circuit configured to generate a current waveform representing an electrical angle in synchronization with a mechanical angle of the stepping motor, and excite the stepping motor using the current waveform; a memory configured to store a value of the electrical angle; and a controller configured to: when a power supply to the stepping motor and the motor driving circuit is stopped, store a first value of the electrical angle held by the motor driving circuit in the memory; and when the power supply is resumed, replace a value of the electrical angle of the motor driving circuit with the first value while suppressing a rotational operation of the stepping motor.

20 Claims, 5 Drawing Sheets

(51) Int. Cl.
  *H02P 8/24*   (2006.01)
  *B65H 20/00*  (2006.01)
  *B65H 20/02*  (2006.01)
  *B41J 29/38*  (2006.01)
  *H02P 8/00*   (2006.01)
  *B41J 33/14*  (2006.01)
  *H02P 8/08*   (2006.01)
  *H02P 8/26*   (2006.01)
  *H02P 8/28*   (2006.01)
  *H02P 8/30*   (2006.01)

(52) U.S. Cl.
  CPC ............ *B65H 20/005* (2013.01); *B65H 20/02* (2013.01); *H02P 8/00* (2013.01); *H02P 8/08* (2013.01); *H02P 8/12* (2013.01); *H02P 8/26* (2013.01); *H02P 8/28* (2013.01); *H02P 8/30* (2013.01); *H02P 2203/03* (2013.01)

(58) Field of Classification Search
  CPC ...... H02P 8/08; H02P 8/12; H02P 8/24; H02P 8/26; H02P 8/28; H02P 8/30; H02P 2203/03
  See application file for complete search history.

(56) References Cited

U.S. PATENT DOCUMENTS

| | | | |
|---|---|---|---|
| 7,893,648 B2 | 2/2011 | Hattori et al. | |
| 8,823,310 B2 * | 9/2014 | Maeda | H02P 8/00 318/696 |
| 2008/0012523 A1 * | 1/2008 | Kobayashi | G05B 19/40 318/696 |

* cited by examiner

DRIVING DEVICE, PRINTER DEVICE, AND METHOD THEREOF

CROSS-REFERENCE TO RELATED APPLICATION

This application is based upon and claims the benefit of priority from Japanese Patent Application No. 2017-142032, filed Jul. 21, 2017, the entire contents of which are incorporated herein by reference.

FIELD

Embodiments described herein relate generally to a driving device, a printer device, and a method thereof.

BACKGROUND

In a conventional printer device, a stepping motor is used as a conveyance motor of a sheet (image receiving medium). In such a printer device, in order to reduce power consumption, an electric power supplied to the conveyance motor and a driving circuit thereof is stopped in a standby mode in which a printing operation is not performed.

In the printer device using the stepping motor as the conveyance motor, a phase shift between an electrical angle and a mechanical angle may occur when the printer device returns from a standby state. Therefore, when returning from the standby state, a process is needed to match phases of the electrical angle and the mechanical angle of the stepping motor. For example, it is known to perform, when the power supply is turned on and a phase shift occurs, phase matching by applying a driving pulse of one pulse or more and holding a phase signal for a predetermined period of time after the stepping motor is energized for a predetermined period of time.

However, in the conventional technology described above, since the stepping motor is driven when the phase matching is performed, the sheet is unintentionally conveyed. Therefore, after the stepping motor is driven for the phase matching, an extra process such as a reverse rotation driving is needed, which is inefficient.

DETAILED DESCRIPTION

In accordance with an embodiment, a driving device for a stepping motor includes a motor driving circuit configured to generate a current waveform representing an electrical angle in synchronization with a mechanical angle of the stepping motor, and excite the stepping motor using the current waveform; a memory configured to store a value of the electrical angle; and a controller configured to: when a power supply to the stepping motor and the motor driving circuit is stopped, store a first value of the electrical angle held by the motor driving circuit in the memory; and when the power supply is resumed, replace a value of the electrical angle of the motor driving circuit with the first value while suppressing a rotational operation of the stepping motor.

Hereinafter, an embodiment of a stepping motor driving device and a printer device will be described in detail with reference to the accompanying drawings. In the embodiment described below, an example in which the present invention is applied to a thermal printer is described, but the present invention is not limited thereto.

Figure 1:
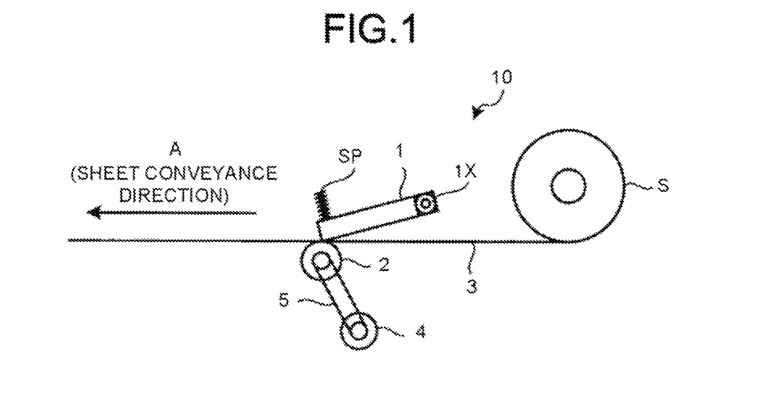
FIG. 1 is a diagram schematically illustrating a schematic structure of a thermal printer according to an embodiment.

FIG. 1 is a diagram illustrating a schematic structure of a thermal printer 10 according to an embodiment. As shown in FIG. 1, the thermal printer 10 has a line thermal head 1 and a platen roller 2. The line thermal head 1 and the platen roller 2 face each other by sandwiching a sheet 3 as an image receiving medium to be supplied as a wound continuous feeding sheet S.

One end of the line thermal head 1 is rotatably supported around a rotation axis 1X as a rotation center. The line thermal head 1 is energized by an energization member SP in such a manner that the other end thereof is pressed to contact with the platen roller 2.

The platen roller 2 is an example of a conveyance roller. The stepping motor 4 is provided for the platen roller 2 and supplies rotational driving force to the platen roller 2. Specifically, the platen roller 2 is connected to the stepping motor 4 via a belt 5 for transmitting the rotational driving force of the stepping motor 4 to the platen roller 2. If the stepping motor 4 starts to rotate, the platen roller 2 rotates in conjunction with the rotation of the stepping motor 4 via the belt 5. For example, the stepping motor 4 is excited by a 1-2 phase excitation system.

The sheet 3 is an example of an image receiving medium. The sheet 3 is a heat sensitive sheet such as a label sheet. The sheet 3 is conveyed in a left direction (sheet conveyance direction A) in FIG. 1 as the platen roller 2 rotates while being sandwiched between the line thermal head 1 and the platen roller 2.

The line thermal head 1 is an example of a printing module. The line thermal head 1 has a plurality of heat generating elements (not shown) arranged in a width direction of the sheet 3. In the line thermal head 1, the heat generating element corresponding to a portion to be printed on the sheet 3 generates heat among a plurality of heat generating elements. As a result, the line thermal head 1 prints an image including characters and the like corresponding to the print data on the sheet 3 being conveyed for each printing line.

The thermal printer 10 inputs a strobe signal to the heat generating element of the line thermal head 1 to enable the heat generating element to generate heat. The thermal printer 10 applies the heat to the sheet 3 to develop color on the sheet 3, thereby printing an image corresponding to the print data on the sheet 3. A distance by which the platen roller 2 rotates when the stepping motor 4 rotates by a predetermined number of pulses, i.e., a conveyance distance of the sheet 3, depends on a gear ratio of a mechanism for transmitting the rotation of the stepping motor 4 to the platen roller 2.

Figure 2:
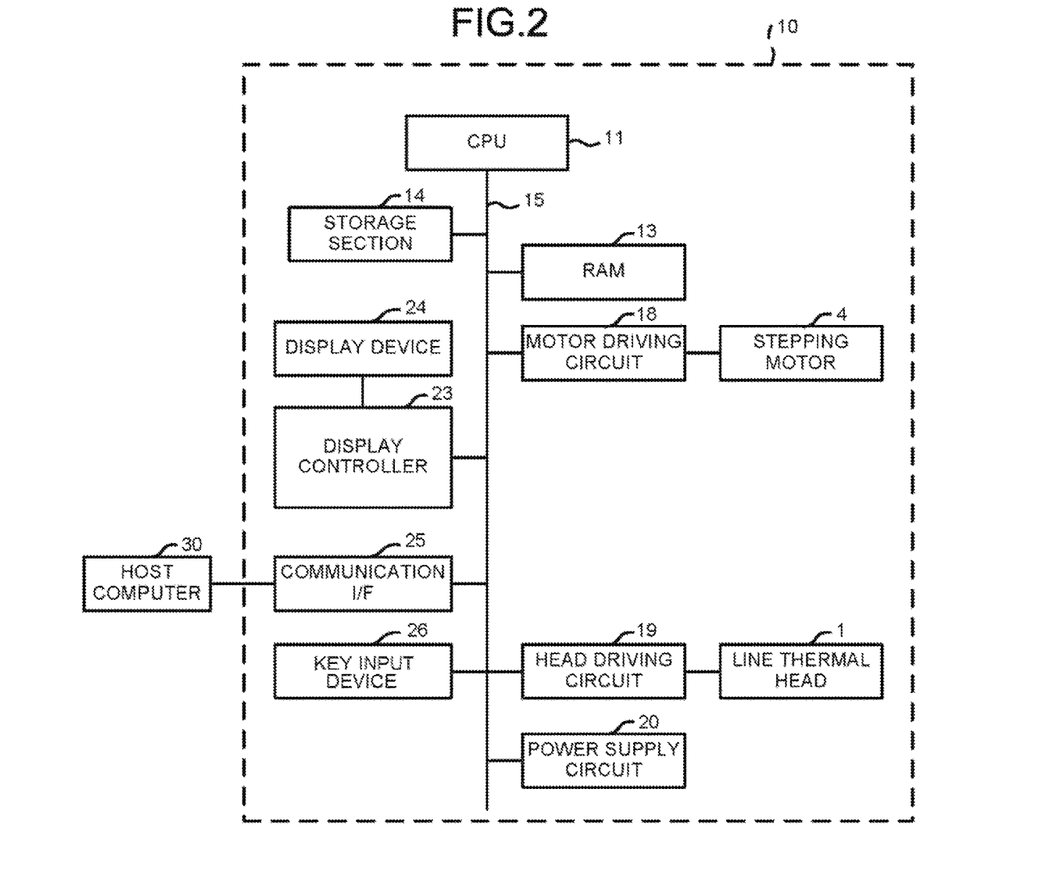
FIG. 2 is a block diagram illustrating an example of a configuration of the thermal printer according to an embodiment.

FIG. 2 is a block diagram illustrating an example of a configuration of the thermal printer 10. As shown in FIG. 2, the thermal printer 10 includes a Central Processing Unit (CPU) 11 that executes various arithmetic processes to collectively control each section of the thermal printer 10. The CPU 11 is connected with a memory including a Random Access Memory (RAM) 13 and a storage section 14 via a system bus 15.

The storage section 14 stores various programs to be executed by the CPU 11 and various data relating to the execution of programs. An operation program executed by the thermal printer 10 of an embodiment may be provided by being recorded in a computer-readable recording medium such as a CD-ROM, a flexible disk (FD), a CD-R, or a Digital Versatile Disk (DVD) in a file of an installable format or an executable format.

Furthermore, the operation program executed by the thermal printer 10 of an embodiment may be stored on a computer connected to a network such as the Internet and provided by being downloaded via the network. The operation program executed by the thermal printer 10 of an embodiment may be provided or distributed via the network such as the Internet.

The RAM 13 temporarily stores various kinds of information. Further, the RAM 13 is used as a print buffer in which print data or image data to be printed on the sheet 3 is temporarily stored. The print data is print object data received from a host computer 30. The print data may be temporarily stored in the storage section 14.

The CPU 11 is connected with a motor driving circuit 18, a head driving circuit 19 and a power supply circuit 20. Under the control of the CPU 11, the motor driving circuit 18 generates a pulse signal (i.e., current waveform) for driving (i.e., rotating) the stepping motor 4 in units of an electrical angle corresponding to a mechanical angle in synchronization with the mechanical angle of the stepping motor 4. Then, the motor driving circuit 18 rotates the stepping motor 4 by exciting the stepping motor 4 using the generated current waveform.

Figure 3:
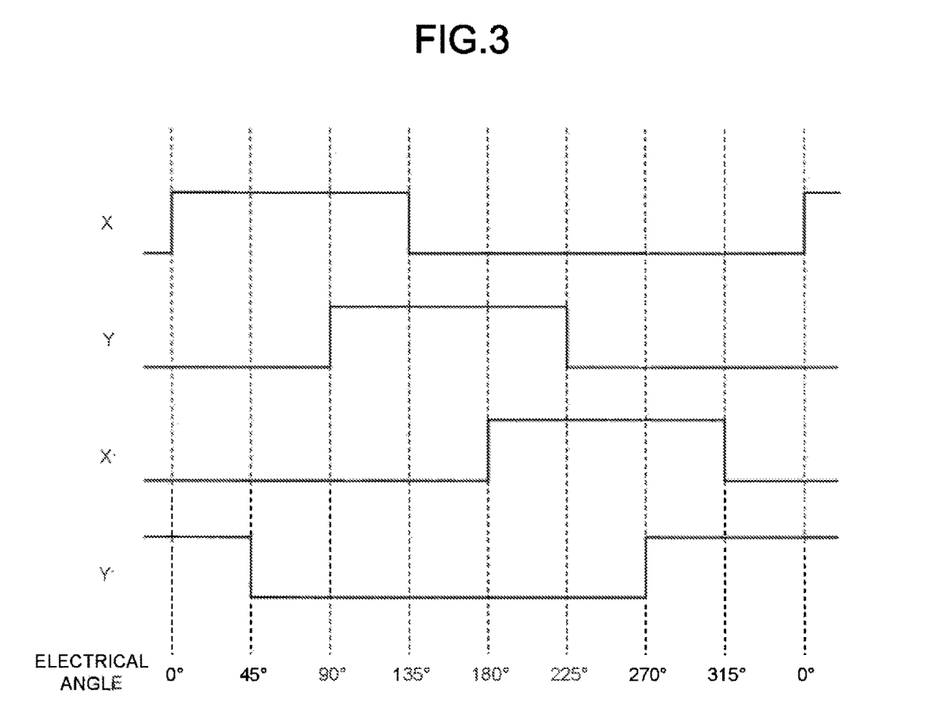
FIG. 3 is a diagram schematically illustrating an example of a current waveform.

FIG. 3 is a diagram schematically illustrating an example of the current waveform, and shows the current waveform corresponding to the 1-2 phase excitation system. As shown in FIG. 3, in the current waveform of the 1-2 phase excitation system, a current value is determined for each electrical angle (step angle) in units of 45 degrees, and is rotated by 360 degrees in 8 steps. One cycle by 8 steps corresponds to an amount of rotation of the stepping motor 4, and can smoothly rotate the stepping motor 4 by applying each of current values X, X', Y, Y' to a corresponding stator 42 (refer to FIG. 4) in synchronization with the mechanical angle of the stepping motor 4. The electrical angle held by the motor driving circuit 18 is synchronously controlled by a known technology so as to coincide with the mechanical angle of the stepping motor 4.

The head driving circuit 19 is controlled by the CPU 11 to be capable of outputting a strobe signal to the heat generating elements of the line thermal head 1 in response to the print data stored in the RAM 13 and allowing a driving current to flow to the heat generating elements of the line thermal head 1. The head driving circuit 19 determines and drives a heat generating element to which the driving current actually flows by a logical product of the strobe signal and the print data. As a result, an image corresponding to the print data is printed on the sheet 3. The power supply circuit 20 supplies the electric power supplied from a commercial power supply (not shown), a battery or the like to each section of the thermal printer 10.

A display controller 23, a communication interface (I/F) 25, and a key input device 26 are connected to the CPU 11. The display controller 23 controls display of information on the display 24 under the control of the CPU 11. The display device 24 displays various kinds of information such as printing status.

The communication interface 25 is used for communicating with an external device such as the host computer 30. The communication interface 25 is infrared communication such as IrDA, a Universal Serial Bus (USB), a Local Area Network (LAN), a RS-232C, a Bluetooth® Technology, and the like.

The key input device 26 includes various keys for a user to input various kinds of information to the thermal printer 10.

The host computer 30 is a device for executing an arithmetic process according to an operation input by the user, such as a personal computer (PC), a cellular phone, a handy terminal, or the like.

The CPU 11 controls each section of the thermal printer 10 by copying the programs stored in the storage section 14 onto the RAM 13 and executing them. For example, when printing the print data, the CPU 11 rotationally drives the stepping motor 4 by controlling the operation of the motor driving circuit 18 to convey the sheet 3 in the sheet conveyance direction A. By controlling the operation of the head drive circuit 19 based on the print data, the CPU 11 prints an image corresponding to the print data on the sheet 3 conveyed in the sheet conveyance direction A.

Further, the CPU 11 switches the operation mode of the thermal printer 10 to a standby mode in response to an operation state of the thermal printer 10. Here, the standby mode is an operation mode in which the thermal printer 10 is in an energy saving state in order to reduce power consumption. Specifically, in the standby mode, the CPU 11 stops the supply of the electric power from a power supply to the line thermal head 1, the stepping motor 4, the motor driving circuit 18, the head drive circuit 19, the display controller 23, and the display 24, thereby reducing the power consumption of the thermal printer 10.

A trigger for shift to the standby mode can be arbitrarily set without particular limitation. For example, the CPU 11 may configure the thermal printer 10 to the standby mode on condition that the printing by the line thermal head 1 is not performed for a predetermined period of time. The CPU 11 may switch the mode of the thermal printer 10 to the standby mode on condition that the shift to the standby mode is instructed via the key input device 26.

Further, in the standby mode, if the state of the thermal printer 10 satisfies a predetermined condition, the CPU 11 releases the standby mode to shift or return to an operation mode or a normal mode which is the mode before shifting to the standby mode. Specifically, the CPU 11 starts or resumes the supply of the electric power to the line thermal head 1, the stepping motor 4, the motor driving circuit 18, the head drive circuit 19, the display controller 23, and the display 24, and in this way, the thermal printer 10 returns from the standby mode.

A trigger for returning from the standby mode can be arbitrarily set without any particular limitation. For example, the CPU 11 may enable the thermal printer 10 to return from the standby mode on condition that the print data is input from the host computer 30. The CPU 11 may enable the thermal printer 10 to return from the standby mode on condition that the return from the standby mode is instructed via the key input device 26.

In the stepping motor 4 and the motor driving circuit 18, at the time of returning from the standby mode, a phase shift may occur between the electrical angle and the mechanical angle. Hereinafter, with reference to FIGS. 4A and 4B, the phase shift between the electrical angle and the mechanical angle generated at the time of returning from the standby mode is described.

Figure 4A:
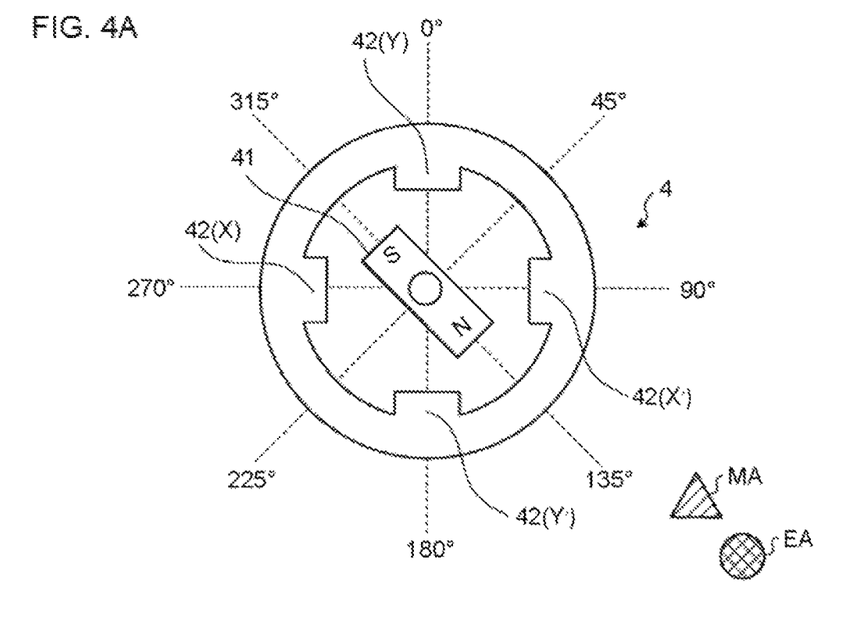
FIGS. 4A and 4B are diagrams each illustrating a phase shift between an electrical angle and a mechanical angle generated at the time of returning from a standby mode.
Figure 4B:
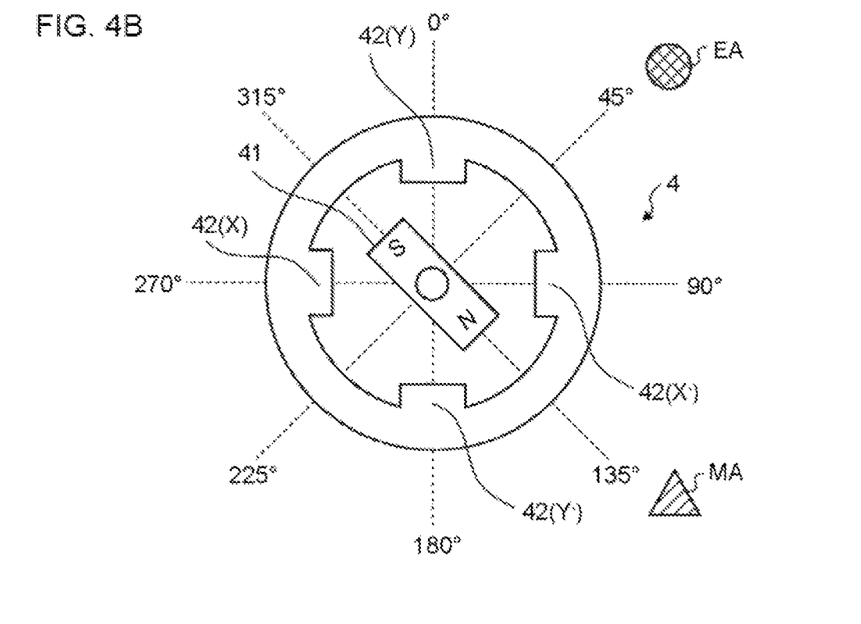

FIGS. 4A and 4B are diagrams each illustrating the phase shift between the electrical angle and the mechanical angle generated at the time of returning from the standby mode. FIG. 4A shows the state of the electrical angle and the mechanical angle immediately before shifting to the standby mode, and FIG. 4B shows the state of the electrical angle and the mechanical angle immediately after shifting to the standby mode. Reference numerals X, X', Y and Y' assigned to the stator 42 correspond to X, X', Y, Y' of the current waveform shown in FIG. 3.

The stepping motor 4 has a rotor 41 made of a magnet or the like, and the stator 42 made of a coil or the like. FIGS. 4A and 4B each show an example in which the stator 42 is provided at 0 degree, 90 degrees, 180 degrees and 270 degrees, and the rotor 41 is rotatably provided at the center of the stator 42. Under the control of the CPU 11, the motor driving circuit 18 enables the current waveform corresponding to an excitation system (e.g., 1-2 phase excitation) of the stepping motor 4 to flow to the stator 42. More specifically, the motor driving circuit 18 rotates the rotor 41 by enabling the current value of the electrical angle corresponding to an actual rotational position of the rotor 41 (i.e., mechanical angle) to flow to the stator 42. In the normal mode before shifting to the standby mode, as shown in FIG. 4A, a mechanical angle MA and an electrical angle EA of the stepping motor 4 coincide with each other.

When shifting from the state in FIG. 4A to the standby mode, the supply of the electric power to the stepping motor 4 and the motor driving circuit 18 is stopped. At this time, the mechanical angle MA of the rotor 41 is held at the rotational position shown in FIG. 4A. When the supply of the electric power to the motor driving circuit 18 is resumed together with the return to the normal mode, as the motor driving circuit 18 is reset, the electrical angle EA held by the motor driving circuit 18 is reset to a predetermined initial value (position or phase) as shown in FIG. 4B. Here, as shown in FIG. 4B, if the initial position (i.e., 45 degrees) of the electrical angle EA is different from the position of the mechanical angle MA of the stepping motor 4 before shifting to the standby mode, the phase shift occurs between the electrical angle EA and the mechanical angle MA. In this case, by driving the stepping motor 4, it is possible to enable the mechanical angle MA to coincide with the initial value of the electrical angle EA, but as the stepping motor 4 rotates, the sheet 3 is inadvertently conveyed.

Therefore, in the thermal printer 10 of the present embodiment, when shifting to the standby mode, the value (position or phase) of the electrical angle held by the motor driving circuit 18 is stored in the storage section 14. When returning from the standby mode, the thermal printer 10 replaces the value of the electrical angle of the motor driving circuit 18 with a value of the electrical angle stored before shifting to the standby mode to execute a phase matching with the mechanical angle. Hereinafter, the configuration of the thermal printer 10 (i.e., the stepping motor driving device) relating to the phase matching is described.

Figure 5:
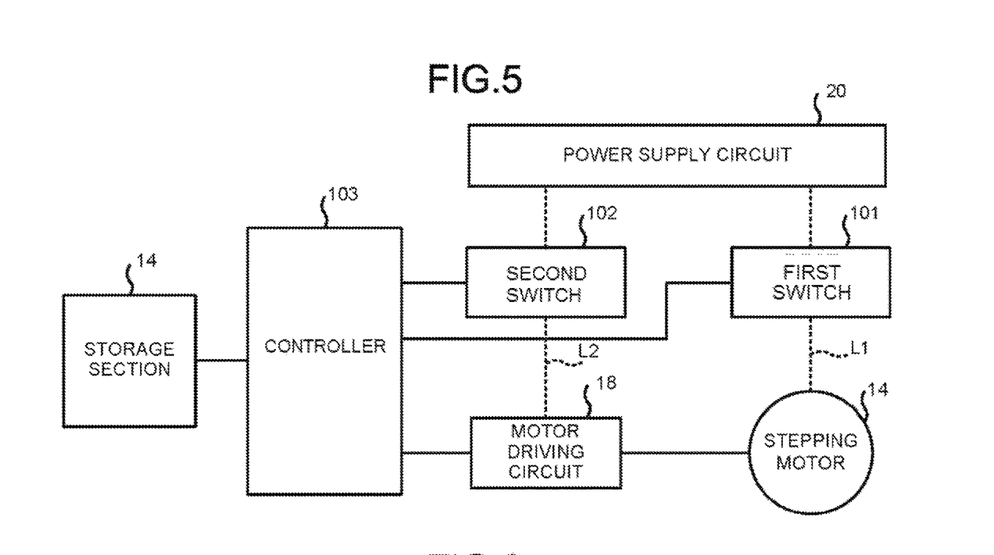
FIG. 5 is a diagram illustrating an example of a configuration of a stepping motor driving device of the thermal printer according to an embodiment.

FIG. 5 is a diagram illustrating an example of the configuration of the stepping motor driving device included in the thermal printer 10. As shown in FIG. 5, in addition to the stepping motor 4, the storage section 14, the motor driving circuit 18 and the power supply circuit 20 described above, the stepping motor driving device includes a first switch 101, a second switch 102 and a controller 103.

The first switch 101 is, for example, a switching element, and is provided on a power supply line L1 for connecting the stepping motor 4 and the power supply circuit 20. Under the control of the controller 103, the first switch 101 connects or disconnects the stepping motor 4 with or from the power supply circuit 20 to turn on or off the power supply for supplying the electric power to the stepping motor 4. Similar to the first switch 101, the second switch 102 is a switching element or the like, and is provided on a power supply line L2 for connecting the motor driving circuit 18 with the power supply circuit 20. Under the control of the controller 103, the second switch 102 connects or disconnects the motor driving circuit 18 with or from the power supply circuit 20 to turn on or off the power supply for supplying the electric power to the motor driving circuit 18. In an embodiment, a single switch element may function as both the first and the second switch.

The controller 103 cooperates with the thermal printer 10 which is the main body device and controls the operation of the stepping motor driving device. The controller 103 may be realized as software by cooperation of the CPU 11 and the program stored in the storage section 14. The controller 103 may be realized as hardware by a dedicated circuit provided in the CPU 11.

The controller 103 executes a process relating to the phase matching between the electrical angle of the motor driving circuit 18 and the mechanical angle of the stepping motor 4 at the time of shifting from the normal mode to the standby mode and at the time of returning from the standby mode to the normal mode.

Specifically, if the thermal printer 10 (i.e., CPU 11) instructs the shift to the standby mode, the controller 103 acquires the value of the electrical angle held by the motor driving circuit 18 and stores it in the storage section 14. Then, the controller 103 stops the supply of the electric power to the stepping motor 4 and the motor driving circuit 18 by switching the first switch 101 and the second switch 102 to an off state. In a case in which the supply of the electric power to the RAM 13 is maintained in the standby mode, the controller 103 may store the value of the electrical angle obtained from the motor driving circuit 18 in the RAM 13.

If the thermal printer 10 (i.e., CPU 11) instructs return from the standby mode, the controller 103 switches the first switch 101 and the second switch 102 to an on state to start the supply of the electric power to the stepping motor 4 and the motor driving circuit 18. As the supply of the electric power is started, the electrical angle of the motor driving circuit 18 is reset to the initial position.

The controller 103 then outputs a control signal to drive the motor driving circuit 18 so that the value of the electrical angle of the motor driving circuit 18 is replaced with the value of the electrical angle stored in the storage section 14. Here, the controller 103 replaces the value of the electrical angle of the circuit 18 with the value of the electrical angle stored in the storage section 14 while suppressing the rotational operation of the stepping motor 4 so that the stepping motor 4 does not rotate according to the pulse signal (i.e., current waveform) output from the motor driving circuit 18.

Here, the method of suppressing the rotational operation of the stepping motor 4 may be various methods without any particular limitation. For example, the controller 103 may reduce the value of the current of the current waveform output from the motor driving circuit 18 to half of the value of the current output in the normal mode so as to become a value in a range in which the stepping motor 4 does not rotate. Alternatively, the controller 103 may adjust the electrical angle of the motor driving circuit 18 while switching the first switch 101 for the stepping motor 4 to the off state. In this case, the controller 103 starts to supply the electric power to the stepping motor 4 by switching the first switch 101 to the on state after changing the electrical angle of the motor driving circuit 18. As a result, the controller 103 can restore the electrical angle of the motor driving circuit 18 to a state before shifting to the standby mode while maintaining the mechanical angle of the stepping motor 4, thereby matching the phases of the electrical angle and the mechanical angle.

The operation of the thermal printer 10 is described below with reference to FIG. 6 and FIG. 7.

Figure 6:
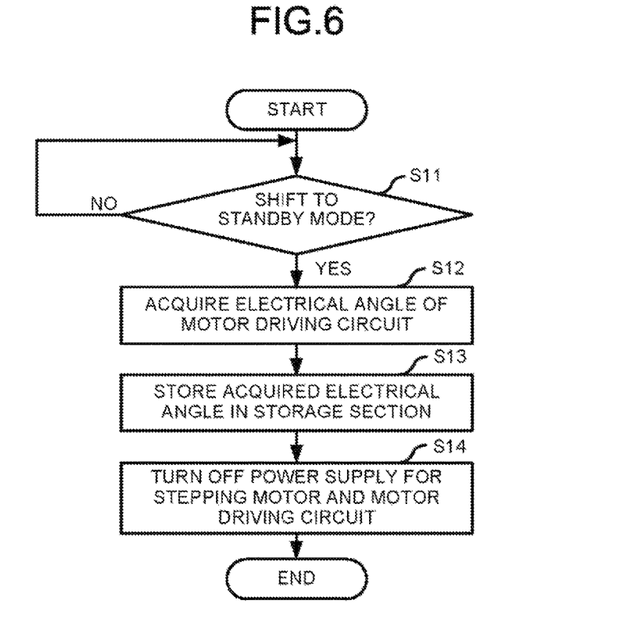
FIG. 6 is a flowchart for depicting an example of a process executed at the time of shift to the standby mode in the thermal printer according to an embodiment.

FIG. 6 is a flowchart for depicting an example of a process executed at the time of shifting to the standby mode in the thermal printer 10. As a premise of the present process, it is assumed that the thermal printer 10 is operating in the normal mode. It is assumed that the electrical angle held by the motor driving circuit 18 and the mechanical angle of the stepping motor 4 coincident with each other.

The controller 103 stands by until the shift to the standby mode is instructed (No in Act S11). When the shift to the standby mode is instructed (Yes in Act S11), the controller 103 acquires the value of the electrical angle held by the motor driving circuit 18 (Act S12) and stores it in the storage section 14 (Act S13).

Next, the controller 103 stops the supply of the electric power to the stepping motor 4 and the motor driving circuit 18 by switching the first switch 101 and the second switch 102 to the off state (Act S14), and then terminates the present process.

Figure 7:
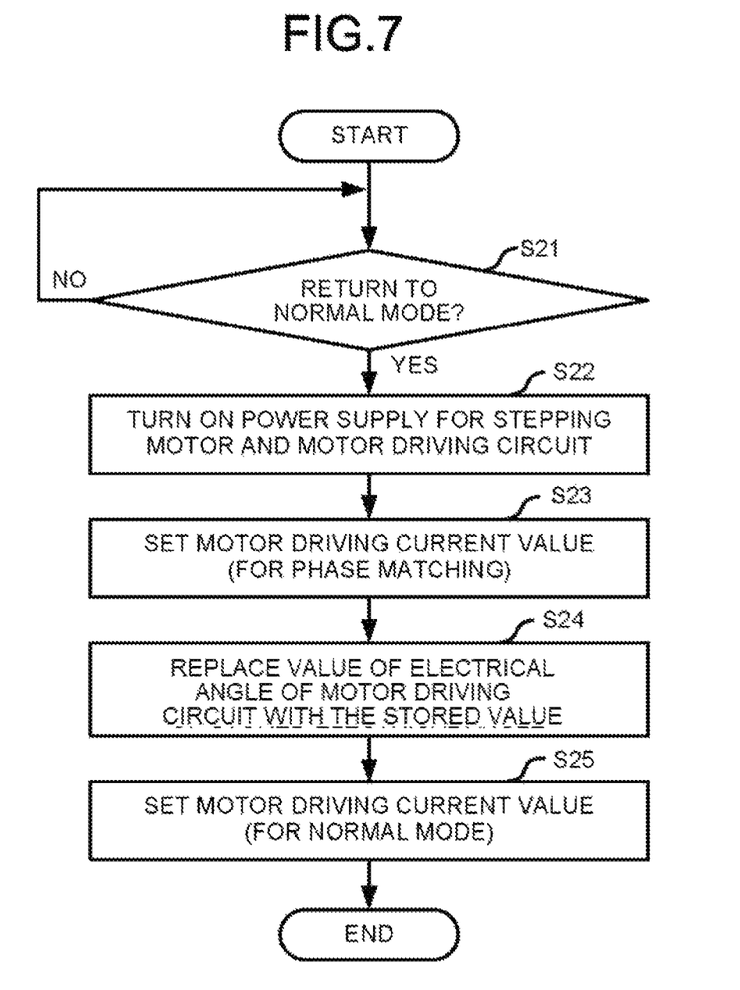
FIG. 7 is a flowchart for depicting an example of a process executed at the time of returning from the standby mode in the thermal printer according to an embodiment.

FIG. 7 is a flowchart for depicting an example of a process executed at the time of returning from the standby mode in the thermal printer 10. As a premise of the process, it is assumed that the thermal printer 10 is in the standby mode.

The controller 103 stands by until the return to the normal mode is instructed (No in Act S21). If the return to the normal mode is instructed (Yes in Act S21), the controller 103 switches the first switch 101 and the second switch 102 to the on state to start to supply the electric power to the stepping motor 4 and the motor driving circuit 18 (Act S22). If a method of stopping the power supply to the stepping motor 4 is used as the method of suppressing the rotational operation of the stepping motor 4, only the supply of the electric power to the motor driving circuit 18 is started in Act S22.

Subsequently, in order to suppress the rotational operation of the stepping motor 4, the controller 103 sets the value of the current of the current waveform output from the motor driving circuit 18 (i.e., motor driving current value) to a value of a current for phase matching which is suppressed in a range in which the stepping motor 4 does not rotate (Act S23). Next, the controller 103 replaces a value of the electrical angle of the motor driving circuit 18 with the value of the electrical angle stored in the storage section 14 (Act S24).

Then, the controller 103 sets the value of the current for the normal mode capable of rotating the stepping motor 4 to the motor driving current value (Act S25) and terminates the present process. If the method of stopping the supply of the electric power to the stepping motor 4 is used as the method of suppressing the rotation operation of the stepping motor 4, Act S23 and Act S25 are not performed, and after Act S24, the supply of the electric power to the stepping motor 4 is started.

As described above, the thermal printer 10 of the present embodiment stores the value of the electrical angle held by the motor driving circuit 18 in the storage section 14 when shifting to the standby mode. When returning from the standby mode, the thermal printer 10 replaces the value of the electrical angle of the motor driving circuit 18 with the value of the electrical angle stored in the storage section 14 while suppressing the rotational operation of the stepping motor 4. As a result, the thermal printer 10 can match the phases of the electrical angle and the mechanical angle in a state in which the conveyance of the sheet 3 is stopped, thereby efficiently performing the phase matching on the stepping motor 4.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

For example, in the above embodiments, the thermal printer 10 is described as an example of the printer device, but a device to which the present invention is applied and a printing method are not limited thereto. In the above embodiment, the phase matching of the stepping motor 4 relating to the conveyance of the sheet 3 is described, but the use of the stepping motor 4 is not limited to this example.

In the above embodiments, the 1-2 phase excitation system is described as the excitation system of the stepping motor 4, but the excitation system is not limited thereto, and excitation systems such as a 1-phase excitation, a 2-phase excitation, a W1-2 phase excitation system may also be applied.

In the above embodiments, the phase matching is performed when returning from the standby mode. However, if the value of the electrical angle of the motor driving circuit 18 immediately before shifting to the standby mode coincides with an initial position of the electrical angle, the phase matching may be skipped when returning from the standby mode. In other words, the controller 103 executes the phase matching on condition that the value of the electrical angle of the motor driving circuit 18 immediately before shifting to the standby mode differs from the initial position of the electrical angle. In the case of adopting such a configuration, the storage section 14 stores an initial position of the electrical angle which is set at the reset of the motor driving circuit 18. When returning from the standby mode, the controller 103 compares the value of the electrical angle of the motor driving circuit 18 immediately before shifting to the standby mode which is stored in the storage section 14 with the initial position of the electrical angle. Then, the controller 103 executes the above phase matching on condition that the values of the two electrical angles are different. Thereby, it is possible to improve the efficiency of the process relating to the phase matching.

In the above-described embodiments, the phase matching is performed when returning from the standby mode. However, the present invention is not limited thereto, and the phase matching may be applied at other timings at which a phase shift between the electrical angle and the mechanical angle occurs. For example, when turning on or off the whole thermal printer 10, as there is a possibility that the phase shift between the electrical angle and the mechanical angle occurs, the above-described phase matching may be performed. In this case, if an instruction to shut down (power off) the thermal printer 10 is received from the CPU 11, the controller 103 acquires the value of the electrical angle held by the motor driving circuit 18, and stores it in the storage section 14. Then, the controller 103 executes the above-described phase matching in accordance with start (power on) of the thermal printer 10.

What is claimed is:

1. A driving device for a stepping motor comprising:
   a motor driving circuit configured to generate a current waveform representing an electrical angle in synchronization with a mechanical angle of the stepping motor, and excite the stepping motor using the current waveform;
   a memory configured to store a value of the electrical angle; and
   a controller configured to:
      when a power supply to the stepping motor and the motor driving circuit is stopped, store a first value of the electrical angle held by the motor driving circuit in the memory; and
      when the power supply is resumed, replace a value of the electrical angle of the motor driving circuit with the first value while suppressing a rotational operation of the stepping motor.

2. The driving device according to claim 1, wherein the controller suppresses the rotational operation by reducing a current value of the current waveform.

3. The driving device according to claim 2, wherein the controller reduces the current value to half of the current value used in a normal state.

4. The driving device according to claim 1, further comprising:
   a switch configured to stop and resume the power supply; wherein
   the controller controls the switch in response to an instruction from a main device on which the driving device is mounted.

5. The driving device according to claim 4, wherein the main device is a printer device, and
   the controller controls the switch to stop the power supply when a thermal head of the printer device has not been operated for a predetermined period.

6. The driving device according to claim 4, wherein the controller controls the switch to stop the power supply when an input device of the main device accepts an operation for enabling a standby mode.

7. The driving device according to claim 4, wherein the controller controls the switch to resume the power supply when the main device receives data from a host computer connected to the main device.

8. The driving device according to claim 1, further comprising:
   a first switch configured to stop and resume the power supply to the stepping motor; and
   a second switch configured to stop and resume the power supply to the motor driving circuit, wherein
   the controller suppresses the rotational operation of the stepping motor by controlling the first switch to stop the power supply to the stepping motor while controlling the second switch to resume the power supply to the motor driving circuit.

9. The driving device according to claim 8, wherein the controller controls the first switch to resume the power supply after the value of the electrical angle of the motor driving circuit is replaced with the first value.

10. The driving device according to claim 1, wherein the controller compares the value of the electrical angle of the motor driving circuit with the first value when the power supply is resumed, and replaces the value of the electrical angle of the motor driving circuit with the first value only when the value of the electrical angle and the first value are not identical.

11. A printer device comprising:
    a conveyance roller configured to convey a medium;
    a stepping motor configured to supply a rotational driving force to the conveyance roller;
    a motor driving circuit configured to generate a current waveform representing an electrical angle in synchronization with a mechanical angle of the stepping motor, and excite the stepping motor using the current waveform;
    a memory configured to store a value of the electrical angle; and
    a controller configured to:
       when a power supply to the stepping motor and the motor driving circuit is stopped, store a first value of the electrical angle held by the motor driving circuit in the memory; and
       when the power supply is resumed, replace a value of the electrical angle of the motor driving circuit with the first value while suppressing a rotational operation of the stepping motor.

12. The printer device according to claim 11, wherein the controller suppresses the rotational operation by reducing a current value of the current waveform.

13. The printer device according to claim 12, wherein the controller reduces the current value to half of the current value used in a normal state.

14. The printer device according to claim 11, further comprising:
    a switch configured to stop and resume the power supply; wherein
    the controller controls the switch in response to an instruction issued in the printer device.

15. The printer device according to claim 14, further comprising
    a thermal head configured to print an image on a sheet, wherein
    the controller controls the switch to stop the power supply when the thermal head has not been operated for a predetermined period.

16. The printer device according to claim 14, further comprising
    an input device configured to accept an operation, wherein
    the controller controls the switch to stop the power supply when the input device accepts the operation for enabling a standby mode.

17. The printer device according to claim 14, wherein the controller controls the switch to resume the power supply when the printer device receives data from a host computer connected to the printer device.

18. The printer device according to claim 14, further comprising
    a first switch configured to stop and resume the power supply to the stepping motor; and
    a second switch configured to stop and resume the power supply to the motor driving circuit; wherein the controller suppresses the rotational operation of the stepping motor by controlling the first switch to stop the power supply to the stepping motor while controlling the second switch to resume the power supply to the motor driving circuit.

19. The printer device according to claim 18, wherein
the controller controls the first switch to resume the power supply after the value of the electrical angle of the motor driving circuit is replaced with the first value.

20. A method performed by a driving device having a stepping motor, a motor driving circuit, and a memory, configured to generate a current waveform representing an electrical angle in synchronization with a mechanical angle of the stepping motor, the method comprising:
  when a power supply to the stepping motor and the motor driving circuit is stopped, storing a first value of the electrical angle held by the motor driving circuit in the memory; and
  when the power supply is resumed, replacing a value of the electrical angle of the motor driving circuit with the first value while suppressing a rotational operation of the stepping motor.

\* \* \* \* \*